Dec. 30, 1969     H. L. DANIELS     3,487,232

ELECTRIC FENCE CHARGING APPARATUS

Filed June 16, 1967

INVENTOR.
HOWARD L. DANIELS
BY
Merchant & Gould
ATTORNEYS

United States Patent Office 3,487,232
Patented Dec. 30, 1969

3,487,232
ELECTRIC FENCE CHARGING APPARATUS
Howard L. Daniels, 272 Oakview Road,
West St. Paul, Minn. 55118
Filed June 16, 1967, Ser. No. 646,658
Int. Cl. H03k 3/57
U.S. Cl. 307—132          2 Claims

ABSTRACT OF THE DISCLOSURE

Apparatus for providing pulses of electrical energy through a fence including a capacitor adapted to be connected to a source of electricity and charged to a predetermined value, a transformer with the secondary connected to a fence and the primary connected to the capacitor and a silicon controlled rectifier so that upon applying a pulse of energy to the gate circuit of the silicon controlled rectifier, the capacitor discharges through the primary of the transformer and provides a pulse of electicity in the fence. The pulse of energy supplied to the gate circuit is obtained by periodically closing a set of electrical contacts, which are sealed in an atmosphere of inert gas, and connected between the gate of the silicon controlled rectifier and a voltage divider network. The contacts are of the magnetic reed type and are periodically closed by a magnet rotated by a synchronous motor.

BACKGROUND OF THE INVENTION

Field of the invention

The function of electric fence chargers is to supply electrical energy to a conductor insulated from ground, so that an animal coming into contact therewith receives a shock which is a deterrent to crossing the boundary defined by the conductor. The principal requirement for such a device is that the electrical energy be delivered in such form that the shock effectively confines the animal, without creating a hazard of injury or death to animals or human beings. It has been found the energy in the form of spaced impulses of relatively short duration may be given sufficiently high intensity to produce a highly effective shock without any significant degree of hazard. Present standards allow a current impulse of 1 ampere peak amplitude and 400 microseconds duration, as measured with a 750 ohms resistive load across the output terminals of the fence charger, provided that it is repeated no oftener than once per second.

Description of the prior art

In general, fence charges of the type described operate by discharging a capacitor periodically into the primary winding of a step-up transformer, the capacitor being recharged to its operating voltage during the interval between impulses. Prior art embodiment utilized motor driven make-and-break contact pairs of various forms to complete a circuit including the capacitor and the transformer. The uncertainties inherent in electrical contacts operated by mechanical means, however, characteristically lead to wide variability in discharge patterns due to contact bounce, corrosion, and dirt problems, also, the operating life of such devices is unpredictable and unsatisfactory. More recently, semiconductor switching devices have been developed utilizing electronic impulse generating circuits to control the trigger. However, fence charging circuits utilizing this circuitry are not capable of establishing and maintaining the repetition rate with sufficient certainty to assure effectiveness together with safety.

SUMMARY OF THE INVENTION

The present invention utilizes a semiconductor switching device to discharge an energy-storing capacitor while employing a constant speed motor to trigger the semiconductor switching device, and more particularly, a magnetically actuated contact pair sealed in an atmosphere of inert gas and controlled by the influence of a magnet affixed to the rotating output shaft of a synchronous motor, produces periodic triggering of the semiconductor switching element. Because a semiconductor switching device is used to discharge the capacitor through the transformer primary winding, the problems associated with mechanical contacts are eliminated. Also, the use of a synchronous motor to periodically operate a magnetically actuated contact pair insures a uniform and reliable repetition rate of pulses through the fence. Because the contact pair is used in the triggering circuit, very little current passes therethrough and the problems of contact bounce, burnt contacts, unreliable operation, etc., are eliminated. The result is a fence charging device which operates with complete certainity of repetition rate and output characteristics over a period of time, which for all practical purposes, it without limit and with substantially no dependence upon variable ambient conditions.

It is an object of the present invention to provide a new and improved electric fence charging apparatus.

It is a further object of this invention to provide fence charging apparatus in which the electrical output characteristics and the impulse repetition rate remain substantially constant over an extended period of operating life.

It is a further object of this invention to provide an electric fence charger in which a semiconductor switching element generates each electrical impulse and a constant speed motor determines the repetition rate of the train of impulses.

It is a further object of this invention to provide electric fence charging apparatus in which the impulse repetition rate is defined by a shaft rotating at constant speed and in which one impulse and only one impulse is generated for a predesignated angle of rotation of such shaft.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
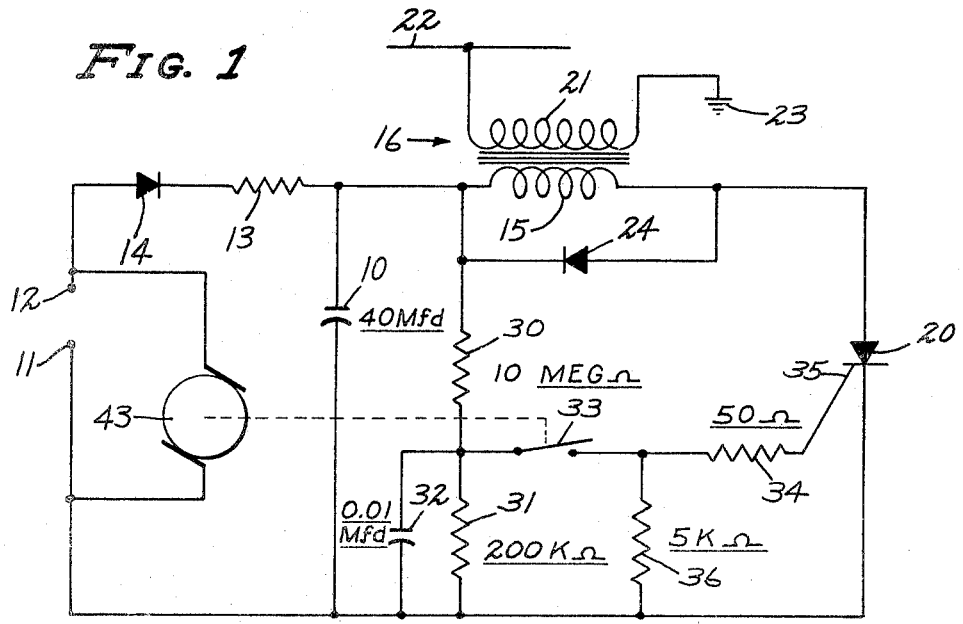
FIGURE 1 is a schematic diagram of the fence charging apparatus.

In FIGURE 1, the numeral 10 designates an energy storing capacitor having one end connected to a terminal 11 and the other end connected to a terminal 12 through a series combination of a resistor 13 and a diode 14. The terminals 11 and 12 are adapted to be connected to a suitable source of energy, such as a 110 volt 60 cycle supply. The resistor 13 and diode 14 are chosen so that the capacitor 10 will charge to a predetermined value of voltage. A primary winding 15 of a transformer, generally designated 16, is connected in series with a semiconductor switching device, which in this particular embodiment is a silicon controlled rectifier (SCR) 20, and the series combination is connected in parallel with the capacitor 10. A secondary winding 21 of the transformer 16 is connected at one end to a fence 22 and at the other end to ground 23. The primary winding 15 of the transformer 16 has a diode 24 connected in parallel therewith to suppress transient pulses of current, which may be produced in the transformer 16 by switching the SCR 20. A voltage divider network consisting of a resistor 30 and a resistor 31 connected in series is connected in parallel across the capacitor 10. A capacitor 32 is connected in parallel with the resistor 31 to supply a triggering current at the junction of the resistors 30 and 31. The junction of the resistors 30 and 31 is connected through a contact pair 33 and a resistor 34 connected in series therewith to a gate 35 of the SCR 20. The closure of the contact pair 33 provides a current path for the triggering current from the junction of the resistors 30 and 31 through the surge limiting resistor 34 to the gate 35. A resistor 36 is connected in parallel with the contacts 33 and the resistor 31. The value of the resistor 36 is such that once the contacts 33 have closed and the capacitor 32 has discharged through the gate circuit 35 to fire the SCR 20, the source voltage applied between terminals 11 and 12 will not develop a sufficient voltage across the resistor 36 to fire the SCR 20. Thus, the SCR 20 will only fire once per closure of the contacts 33, since the contacts 33 must open to charge the capacitor 32 to the firing value.

In FIGURE 1, typical values of the various components are set forth, but it should be understood that variations in the values as well as the circuitry might be made by one skilled in the art and all such variations are fully intended to come within the scope of this invention. Further, it should be understood that much more elaborate, and in some cases much simpler circuitry could be utilized to insure a uniform and desirable repetition rate of the electrical pulses in the fence 22.

Figure 2:
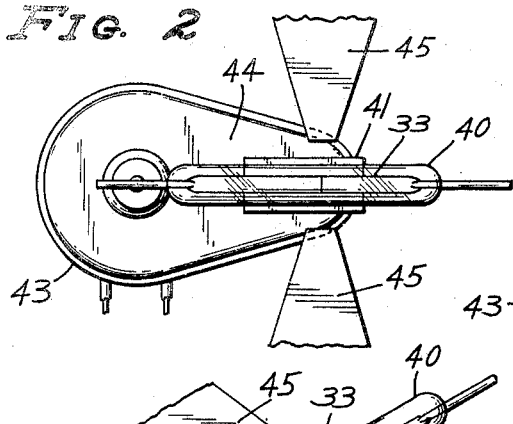
FIGURE 2 is a view in top plan of the magnetically actuated contact pair and the means for operation thereof.
Figure 3:
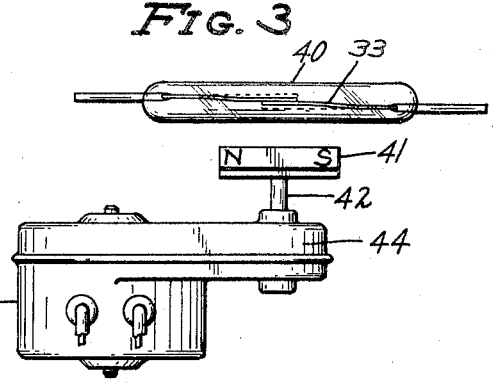
FIGURE 3 is a view in side elevation of the apparatus illustrated in FIGURE 2 with the contacts closed, the contacts are illustrated in the open position in dotted lines, portions thereof being removed.
Figure 4:
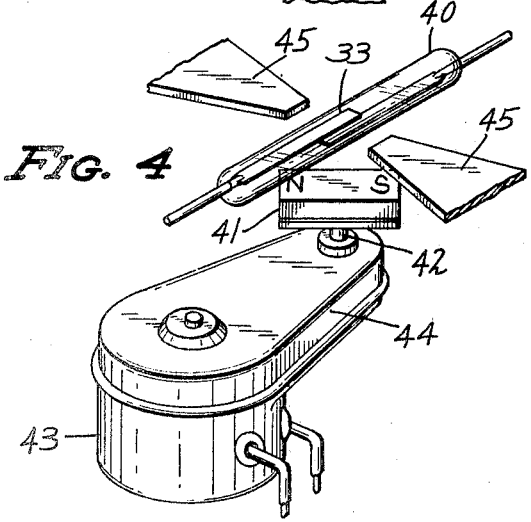
FIGURE 4 is a view in perspective of the apparatus illustrated in FIGURE 2.

Referring to FIGURES 2 through 4, the contacts 33 are illustrated as a magnetically actuated contact pair sealed in an atmosphere of inert gas by a glass chamber 40. Because the contact pair 33 is sealed in an atmosphere of inert gas there is no danger of corrosion, dirt, etc. A permanent bar magnet 41 is fixedly attached to a shaft 42 driven by a synchronous motor 43 through a gear train 44 (the gear train 44 is enclosed within a housing). The bar magnet 41 is mounted so that it rotates in a plane parallel with but not containing the contact pair 33. When the magnet 41 rotates into a position in which it is parallel with but spaced from the contact pair 33, the contact pair 33 acts as a partial circuit for the magnetic flux of the magnet 41. The magnetic flux passing through the contact pair 33 causes the operation thereof and a consequent pulse on the fence 22. As the magnet 41 continues to rotate, the contact pair 33 opens and 180° of rotation later, the magnet 41 and contact pair 33 are again parallel and the contact pair 33 closes. The gear train 44 can be adjusted so that the magnet 41 rotates at any desirable periodic interval. The motor 43 is illustrated schematically in FIGURE 1 connected across the terminals 11 and 12. The magnetic operation of the contact pair 33 by the magnet 41 and motor 43 is illustrated by a dotted line.

When the magnet 41 is parallel with the contact pair 33, the lines of flux passing through the contact pair 33 have a tendency to hold the magnet 41 in the parallel position, thereby producing a torque on the motor 43. This torque, regardless how small, may have some effect on the motor 43 and is, therefore, undesirable. To compensate for such torque, a pair of flux gathering plates 45 are mounted so as to radiate outwardly from either side of the contacts 33 approximately perpendicular thereto and in a plane parallel with the plane of rotation of the magnet 41. The flux gathering plates 45 provide a path for the magnetic flux when the magnet 41 is perpendicular to the contact pair 33. A torque is also produced when the magnet 41 is parallel with the flux gathering plates 45. Thus, the flux gathering plates 45 have a tendency to distribute the torque produced on the motor 43 throughout a complete revolution.

An electric fence charger apparatus has been disclosed which accurately provides pulses of energy at periodic intervals on a fence 22. Because of the safety feature incorporated within the circuitry, these pulses of energy will always be spaced the desired distance apart. Also, because no mechanical contacts are used to switch large amounts of current, there is no arcing or other contact where prevalent in previous circuits, and the mechanical contacts utilized will operate correctly for a greatly extended period of time.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:
1. A fence charger comprising:
 (a) a capacitor adapted to be connected to a suitable source of energy to charge said capacitor to a predetermined voltage;
 (b) a transformer having a secondary winding adapted to be connected to a fence and a primary winding;
 (c) semiconductor switching circuitry connecting said capacitor to said primary winding of said transformer and completing a circuit for the discharge of said capacitor through said primary winding upon the proper energization of said semiconductor switching circuitry;
 (d) periodically operating mechanical switching circuitry including a magnetic reed switch in an atmosphere of inert gas and a magnet fixedly attached to the shaft of a constant speed motor for rotation therewith and mounted for periodically operating said magnetic reed switch during the rotation of said motor, said switching circuitry being connected to a suitable source of energization and to said semiconductor circuitry for periodically energizing said semiconductor switching circuitry to discharge said capacitor through said primary winding.

2. A fence charger as set forth in claim 1 wherein flux-transmissive members are disposed in the field of the magnet to minimize variations of torque on the constant speed motor.

References Cited

UNITED STATES PATENTS

| 2,249,696 | 7/1941 | Pfanstiehl | 307—132 X |
| 2,315,374 | 3/1943 | Hutchens | 307—132 |
| 2,981,854 | 4/1961 | Grace et al. | 307—132 |
| 3,030,526 | 4/1962 | Fuks | 307—132 |
| 3,299,336 | 1/1967 | Johannes | 307—252 X |
| 3,302,128 | 1/1967 | Schoemehl et al. | |
| 3,333,111 | 7/1967 | Houle | 307—134 X |
| 3,169,212 | 2/1965 | Walters | 320—1 X |

ROBERT K. SCHAEFER, Primary Examiner
T. B. JOIKE, Assistant Examiner

U.S. Cl. X.R.
307—252